(12) United States Patent
Humburg

(10) Patent No.: US 9,764,619 B2
(45) Date of Patent: Sep. 19, 2017

(54) HEAT EXCHANGER ARRANGEMENT, ESPECIALLY FOR A VEHICLE HEATER

(71) Applicant: Eberspächer Climate Control Systems GmbH & Co. KG, Esslingen (DE)

(72) Inventor: Michael Humburg, Göppingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 453 days.

(21) Appl. No.: 14/078,954

(22) Filed: Nov. 13, 2013

(65) Prior Publication Data
US 2014/0134559 A1     May 15, 2014

(30) Foreign Application Priority Data

Nov. 14, 2012    (DE) ........................ 10 2012 220 789

(51) Int. Cl.
| | |
|---|---|
| *B60H 1/22* | (2006.01) |
| *F24H 1/12* | (2006.01) |
| *F24H 9/20* | (2006.01) |
| *F24H 1/26* | (2006.01) |
| *F24H 3/06* | (2006.01) |
| *F24H 9/14* | (2006.01) |

(52) U.S. Cl.
CPC .......... *B60H 1/2221* (2013.01); *F24H 1/124* (2013.01); *F24H 1/263* (2013.01); *F24H 3/065* (2013.01); *F24H 9/142* (2013.01); *F24H 9/2035* (2013.01); *B60H 2001/2271* (2013.01); *F24D 2220/0271* (2013.01)

(58) Field of Classification Search
CPC .......... F24H 1/263; F24H 1/124; F24H 9/142; F24H 3/065; B60H 2001/2271; B60H 1/2221
See application file for complete search history.

(56) References Cited

U.S. PATENT DOCUMENTS

| | | | | |
|---|---|---|---|---|
| 4,565,184 A | * | 1/1986 | Collins ..................... | F23B 1/36 110/110 |
| 4,613,072 A | * | 9/1986 | Kikuchi ............... | B60H 1/2209 122/448.1 |
| 4,637,371 A | * | 1/1987 | Rathel .................. | B60H 1/2209 122/182.2 |
| 4,976,463 A | * | 12/1990 | Soo ...................... | B60H 1/2209 237/12.3 B |
| 5,611,299 A | * | 3/1997 | Varga ...................... | F23M 7/04 122/367.1 |

(Continued)

FOREIGN PATENT DOCUMENTS

| | | | | |
|---|---|---|---|---|
| CN | 102642455 A | | 8/2012 | |
| DE | 3611092 A1 | * | 10/1987 | ............. F24H 1/263 |

(Continued)

*Primary Examiner* — Steven B McAllister
*Assistant Examiner* — Steven Anderson, II
(74) *Attorney, Agent, or Firm* — McGlew and Tuttle, P.C.

(57) ABSTRACT

A heat exchanger arrangement, especially for a vehicle heater, includes a pot-like heat exchanger housing (12) with an inner wall (22, 24) and with an outer wall (18, 20). A heat carrier medium flow space is formed between the inner wall (22, 24) and the outer wall (18, 20). A first flow opening (54) is provided on the outer wall (18, 20) and, adjoining this, a pump housing (58) made integrally with the outer wall (18, 20) for a heat carrier medium pump is provided.

11 Claims, 4 Drawing Sheets

(56) References Cited

U.S. PATENT DOCUMENTS

| | | | | |
|---|---|---|---|---|
| 5,653,387 A | * | 8/1997 | Takayanagi | B60H 1/2212 237/12.3 C |
| 5,788,150 A | * | 8/1998 | Bittmann | B60H 1/2209 165/169 |
| 6,089,465 A | | 7/2000 | Habijanec et al. | |
| 6,260,545 B1 | * | 7/2001 | Suzuki | F02B 33/443 123/550 |
| 6,932,151 B2 | * | 8/2005 | Galtz | B60H 1/2209 165/142 |

FOREIGN PATENT DOCUMENTS

| | | | |
|---|---|---|---|
| DE | 10 2006 012212 A1 | 9/2007 | |
| DE | 10 2011 081 401 A1 | 2/2013 | |
| EP | 0262546 A2 * | 4/1988 | B60H 1/2212 |
| EP | 0967439 A2 | 12/1999 | |
| EP | 0 916 908 B1 | 4/2004 | |
| EP | 1 363 796 B1 | 11/2004 | |
| GB | 741 125 A | 11/1955 | |

\* cited by examiner

HEAT EXCHANGER ARRANGEMENT, ESPECIALLY FOR A VEHICLE HEATER

CROSS REFERENCE TO RELATED APPLICATIONS

This application claims the benefit of priority under 35 U.S.C. §119 of German Patent Application DE 10 2012 220 789.9 filed Nov. 14, 2012, the entire contents of which are incorporated herein by reference.

FIELD OF THE INVENTION

The present invention pertains to a heat exchanger arrangement, especially for a vehicle heater, comprising a pot-like (pot-shaped) heat exchanger housing with an inner wall and with an outer wall, wherein a heat carrier medium flow space is formed between the inner wall and the outer wall.

BACKGROUND OF THE INVENTION

Such a heat exchanger arrangement is known from EP 0 916 908 B1. The pot-like heat exchanger housing of this heat exchanger arrangement comprises an outer housing part with an outer circumferential wall and with an outer bottom wall as well as an inner housing part with an inner circumferential wall and with an inner bottom wall. Connecting branches, via which heat carrier medium to be sent into the heat carrier medium flow space, i.e., for example, water, can be fed and removed from the heat carrier medium flow space, are provided on the outer housing part. A ring-like outer circumferential wall section, which is to be connected, on the one hand, to the outer circumferential wall of the outer housing part for enclosing the heat carrier medium flow space in a fluid-tight manner, is integrally connected to the inner circumferential wall of the inner housing part. On the other hand, this outer circumferential wall section defines, together with the inner circumferential wall, a ring-like area of the heat carrier medium flow space, through which passes a waste gas flow connecting piece leading into an interior space of the housing arrangement.

A fuel-operated vehicle heater of such a design can be used, for example, as a vehicle heating system as is shown in FIG. 1 of DE 10 2006 012 212 A1. It is possible in this vehicle heating system to send the medium to be heated, here the cooling liquid in the coolant system of an internal combustion engine via different flow paths in a temperature-dependent and pressure-dependent manner. A flow connection, which can be released or blocked by a valve arrangement operating in both a pressure-dependent manner and a temperature-dependent manner, is created for this between an inlet leading to the heat carrier medium flow space of a heat exchanger arrangement and an outlet leading away from the heat carrier medium flow space. It is possible in this manner to send the heat carrier medium, for example, only through a vehicle heat exchanger for heating the air to be introduced into the interior space of the vehicle but not through the internal combustion engine, or to also send it additionally through the internal combustion engine or only through the vehicle heat exchanger and the internal combustion engine, but essentially not through the heat exchanger arrangement.

SUMMARY OF THE INVENTION

An object of the present invention is to provide a heat exchanger arrangement of a compact design, especially for a vehicle heater or for integration into a vehicle heating system.

This object is accomplished according to the present invention by a heat exchanger arrangement, especially for a vehicle heater, comprising a pot-like (pot shaped) heat exchanger housing with an inner wall and with an outer wall. A heat carrier medium flow space is formed between the inner wall and the outer wall. A first flow opening is provided on the outer wall and, adjoining this a pump housing designed integrally with the outer wall for the heat carrier medium pump is provided.

In the design according to the present invention, the pump housing for the heat carrier medium pump forms an integral part of the heat exchanger housing. This leads to a compact design and makes additional mounting steps for connecting a housing to the heat exchanger housing unnecessary.

For example, the first flow opening may be provided by a first flow connecting piece, so that the pump housing can be in connection through this flow connecting piece with the heat exchanger housing.

The design can be further simplified by the first flow connecting piece being made integrally with the outer wall and by the pump housing being made integrally with the first flow connecting piece.

The pump housing may have a pot-like design itself with a bottom wall and with a circumferential wall. A delivery wheel that can be driven by a pump motor may be positioned in the interior space of the pump housing in order to deliver fluid to be heated via the first flow opening, e.g., water, through the heat carrier medium flow space.

It is proposed in an arrangement that is especially advantageous for the mounting of the heat carrier medium pump that the pump housing be connected to the first flow opening in the area of the circumferential wall.

To make it possible to bring the pump housing itself into connection with a flow circuit for the heat carrier medium, it is proposed that a line connecting branch be connected to the pump housing. To have the line connecting branch easily accessible for the connection to the heat carrier medium circuit, it is proposed that the line connecting branch be connected to the pump housing in the area of the bottom wall.

The overall design can be further simplified by the line connecting branch being made integrally with the pump housing. To provide a feed and a removal of heat carrier medium in a defined manner, it is proposed that a second flow opening, preferably formed by a second flow connecting piece, be provided on the outer wall.

It is advantageous, especially if the heat exchanger arrangement according to the present invention is intended for being integrated into a vehicle heating system, as is known, for example, from DE 10 2006 012 212 A1, if a bridging line connects the first flow opening, preferably the line connecting branch, to the second flow opening.

The pot-like structure of the heat exchanger housing with a double-walled design provided for providing the heat carrier medium flow space can be embodied in a simple manner by the heat exchanger housing extending in the direction of a longitudinal axis of the housing and comprising an inner housing part with an inner circumferential wall and with an inner bottom wall as well as an outer housing part with an outer circumferential wall and with an outer bottom wall, wherein the first flow opening or/and the second flow opening is provided on the outer circumferential wall.

Since the outer housing part, at which the pump housing may also be provided as an integral part, is subject to a comparatively low thermal load, this may be designed an injection-molding plastic part to obtain an especially lightweight and cost-effective design, preferably together with the first or/and the second flow connecting piece. The inner housing part, which is subject to a higher thermal load especially due to direct contact with comparatively hot combustion waste gases, may be designed as a die-cast metal part, for example, with aluminum as the material, preferably together with a waste gas flow connecting piece provided on the inner housing part.

Especially if the housing parts shall be provided as cast parts, the possibility of manufacturing these in a simple manner with the different assembly units provided integrally thereon, especially the pump housing according to a casting method, is supported by the fact that a front surface defining the heat carrier medium flow space in the axial direction is provided at the inner circumferential wall of the inner housing part, wherein said front surface is arranged obliquely in relation to the longitudinal axis of the housing, and by the fact that the outer circumferential wall of the outer housing part ends obliquely in an axial end area located at a distance from the outer bottom wall and is connected to the inner housing part in the area of the front surface, preferably such that the heat carrier medium flow space is defined on the outside in the radial direction essentially only by the outer circumferential wall of the outer housing part.

In another variant, which is advantageous for carrying out a casting method especially for the integral connection of the pump housing, it is proposed that the first flow opening be provided in an axial end area of the outer circumferential wall, which said end area is located at a distance from the outer bottom wall, in a first circumferential area of the outer circumferential wall, wherein the outer circumferential wall has a shorter axial length of extension, starting from the outer bottom wall, in a second circumferential area located opposite the first circumferential wall in relation to the longitudinal axis of the housing, than in the first circumferential area.

The present invention pertains, furthermore, to a vehicle heater, comprising a burner area to be fed with fuel and combustion air and a heat exchanger arrangement designed according to the present invention, wherein a heat carrier medium pump motor is provided at the pump housing.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
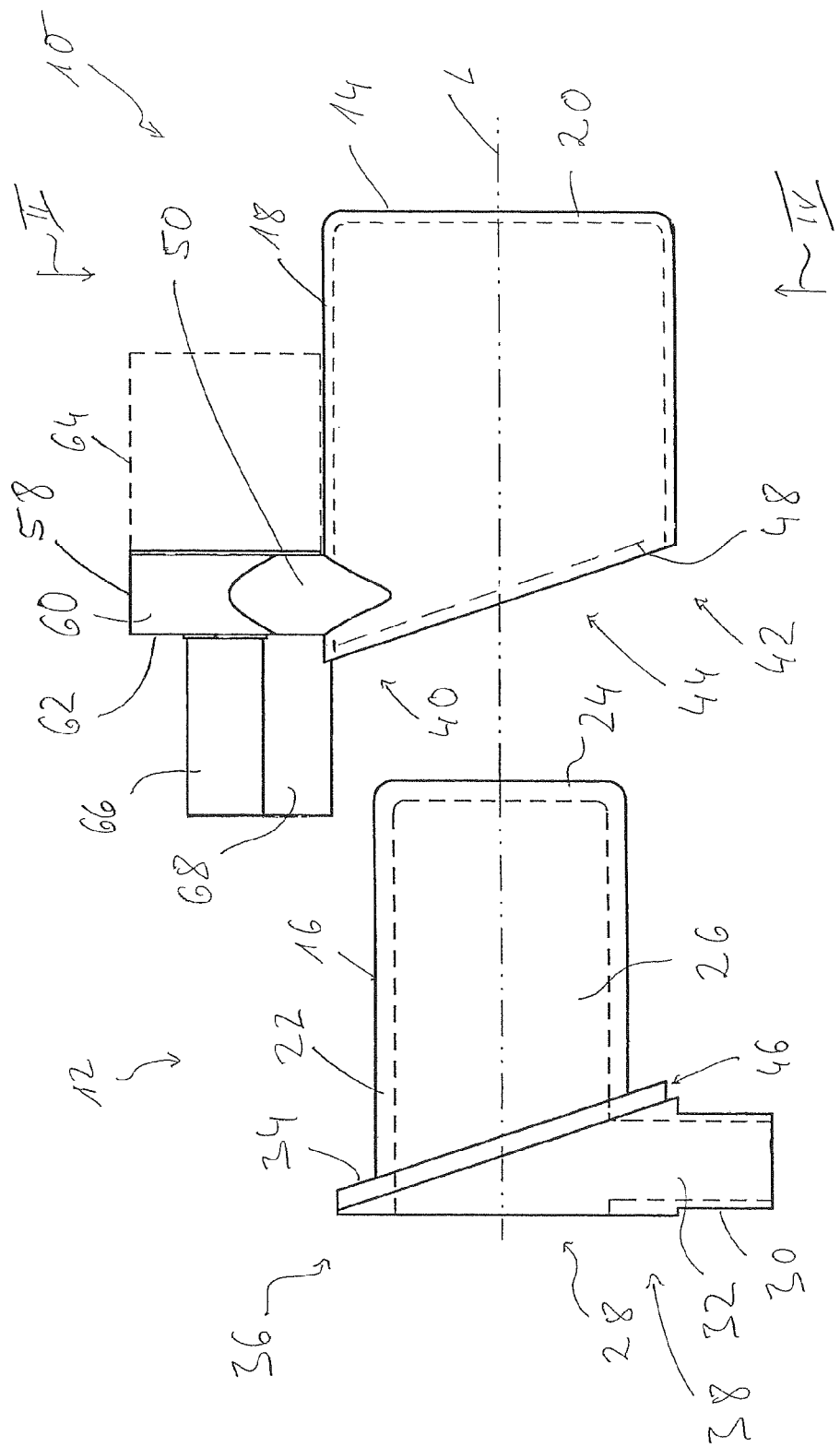
FIG. 1 is an exploded view and a side view of a heat exchanger arrangement designed with an outer housing part and with an inner housing part.
Figure 2:
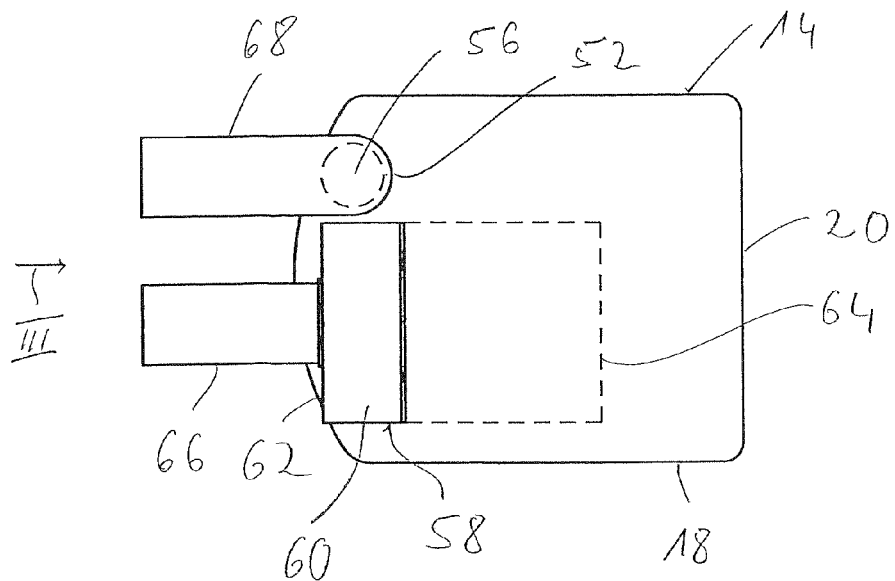
FIG. 2 is a side view showing the outer housing part of the heat exchanger arrangement according to FIG. 1, as viewed in direction II in FIG. 1.
Figure 3:
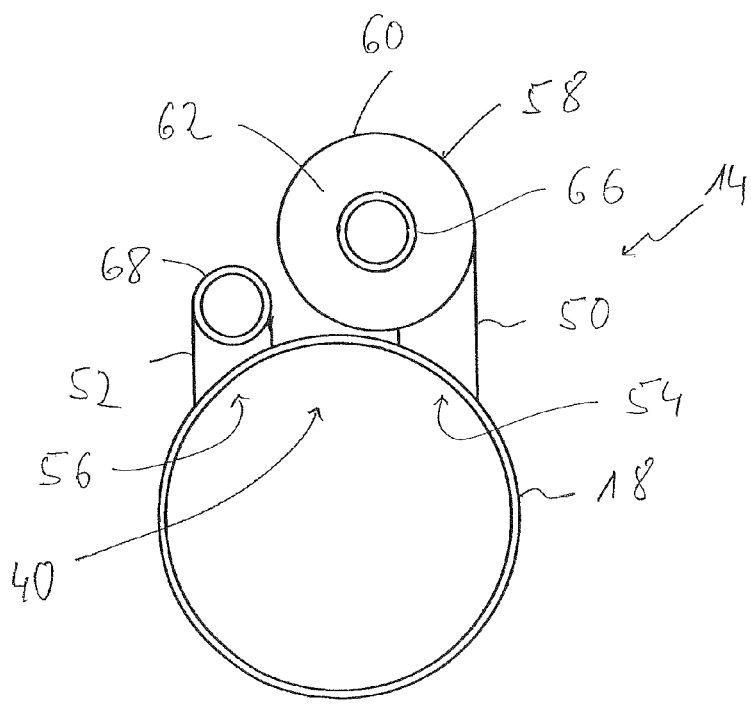
FIG. 3 is an end view of the outer housing part, as viewed in direction III in FIG. 2.

Referring to the drawings in particular, FIG. 1 shows a heat exchanger arrangement generally designated by 10 for a vehicle heater. This comprises a heat exchanger housing 12 generally designed with a pot-like structure with an outer housing part 14 and with an inner housing part 16. The outer housing part 14 is designed with an outer circumferential wall 18 extending in the direction of the longitudinal axis L of the housing and with an outer bottom wall 20. The inner housing part 16 is designed with an inner circumferential wall 22 likewise extending along the longitudinal axis L of the housing and with an inner bottom wall 24. The two pot-like housing parts 14, 16 are inserted one into the other in the assembled state, so that a heat carrier medium flow space is formed due to the double-walled structure between the outer circumferential wall 18 and the outer bottom wall 20, on the one hand, and the inner circumferential wall 22 and the inner bottom wall 24, on the other hand The hot combustion waste gases generated in a burner area flow in an interior space 26 of the heat exchanger housing 10 or of the inner housing part 16, and a waste gas flow space is formed between the inner circumferential wall 22 and a flame tube, not shown in the figures. The combustion waste gases leaving the flame tube are deflected radially outwardly at the inner bottom wall 24 and flow in the waste gas flow space in the direction of an axial end area 28 of the inner housing part 22, which said end area faces away from the inner bottom wall 24. The interior space 26 or the waste gas flow space is closed in this axial end area 28, for example, by a plate-like closing member used for connection to the burner area. The combustion waste gases leave the interior space 26 through a discharge opening 32 formed in a waste gas flow connecting piece 30 of the inner housing part 16.

The waste gas flow connecting piece 30 forms an integral part of the inner housing part 16 and is located in an area outside the heat carrier medium flow space formed between the two housing parts 14, 16. This heat carrier medium flow space is defined axially by a front surface 34 of the inner housing part 16. This front surface 34 is formed by a, for example, stepped radial expansion of the outer circumference of the inner circumferential wall 22 and is positioned obliquely in relation to the longitudinal axis L of the housing. With the outer circumference of the inner circumferential wall 22 being essentially round, the front surface 34 thus has a generally elliptical shape. Based on the oblique position of the front surface 34, the latter has a greater axial distance from the inner bottom wall 24 in a first circumferential area 36 of the inner circumferential wall 22 than in a second circumferential area 38 located essentially diametrically opposite the first circumferential area 36 in relation to the longitudinal axis L of the housing. A sufficient axial space is thus created in this second circumferential area 38 to provide the opening 32 or the waste gas flow connecting piece 30 there.

The outer circumferential wall 18 is designed on the outer housing part 14 such that it has a greater axial extension, starting from the outer bottom wall 20, in a first circumferential area 40 than in a second circumferential area 42 located essentially diametrically opposite the first circumferential area 40 in relation to the longitudinal axis L of the housing. Based on this different axial extension, the first housing part 14 ends obliquely in an axial end area 44 located at a distance from the outer bottom wall 20, and the angle of the oblique position in relation to the longitudinal axis L of the housing essentially corresponds to the angle of the oblique position of the front surface 34 on the inner housing part 16. The outer housing part 14 with its axial end area 44 is connected to the inner housing part 16 in the area of the front surface 34 in the assembled state. A mounting step, generally designated by 46, may be provided for this on the inner housing part 16, adjoining the front surface 34. A complementary mounting step 48 may also be provided, for example, in the axial end area 44 of the outer circumferential wall 18.

An overall arrangement is thus obtained, in which the heat carrier medium flow space is defined in the axial direction by the front surface 34, is defined inside in the radial direction by the inner circumferential wall 22 and is defined on the outside in the radial direction essentially exclusively by the circumferential wall 18. Since undercuts, which, defined exclusively by the inner housing part 16, provide an additional area of the heat carrier medium flow space, are not necessarily formed on the inner housing part 16 in the area of the front surface 34 axially defining the heat carrier medium flow space, the inner housing part 16 may be manufactured with a comparatively simple overall structure in a casting operation, for example, according to a metal die-casting method. It shall, however, be pointed out that undercut areas, which may be advantageous, for example, for the inflow and outflow of heat carrier medium for fluidic reasons, may possibly be formed, for example, close to the first circumferential area 36 of the inner circumferential wall 22 in the front surface 34. The design in which heat carrier medium does not flow past the waste gas flow connecting piece 30 but the latter is located entirely outside the heat carrier medium flow space is now nevertheless preserved.

Two flow connecting pieces 50, 52 are provided at circumferentially spaced locations from one another at the outer circumferential wall 18 of the outer housing part 14. These extend essentially in parallel with one another in the area of the first circumferential area 40 of the outer circumferential wall 18 and form flow openings 54, 56 each, which are open towards the heat carrier medium flow space.

A pump housing generally designated by 58 is provided for a heat carrier medium pump with the first flow connecting piece 50. The pump housing 58 itself has an essentially pot-like structure and has a circumferential wall 60 and a bottom wall 62. The pump housing 58 is axially open in the direction of the outer bottom wall 14. A pump impeller, not shown in the figures, which is carried on a drive shaft of a pump motor 64 indicated by broken lines in the figures, can be inserted from this side into the pump housing 58. The pump impeller thus rotates about an axis of rotation that is essentially parallel with the longitudinal axis L of the housing and can deliver heat carrier medium, i.e., for example, water, through the first flow connecting piece 50 or the first flow opening 54 into the heat carrier medium flow space.

A line connecting branch 66 extends at the bottom wall 62 of the pump housing 58, for example, centrically therefrom and advantageously essentially in parallel with the longitudinal axis L of the housing. A line connecting branch 68 is formed in a corresponding manner at the second flow connecting piece 52, which may be designed, for example, with a bent or L-shaped form. The heat exchanger arrangement 10 can be connected with these two line connecting branches 66, 68 to connection lines of a heat carrier medium circuit, i.e., for example, the coolant system in a motor vehicle.

Figure 4:
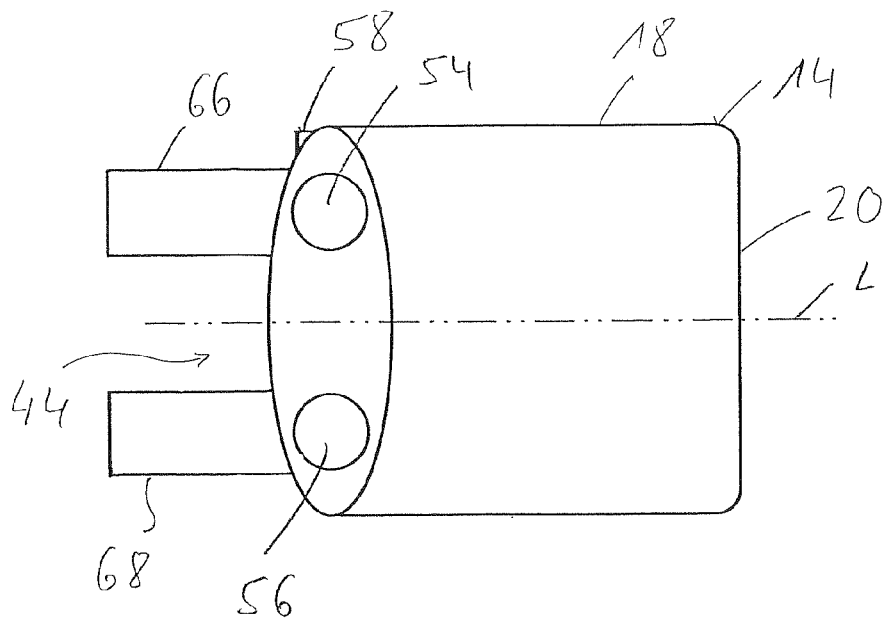
FIG. 4 is a side view of the outer housing part of the heat exchanger arrangement according to FIG. 1, as viewed in direction IV in FIG. 1.

It can be clearly recognized in FIGS. 1 and 4 that based on the positioning of the two flow connecting pieces in the area of the first circumferential area 40 of the outer circumferential wall 18, the two flow openings 54, 56 are located in an axial area that is not covered by the second circumferential area 42 of the outer circumferential wall 18 on a side that is an opposite side in relation to the longitudinal axis L of the housing. In case of manufacturing the outer housing part 14 in a casting operation, this makes it possible to insert or remove cast parts, which are provided for forming the two flow connecting pieces 50, 52 and the flow openings 54, 56, in a comparatively simple manner. Based on this oblique end of the outer circumferential wall 18 in the axial end area 44 and the circumstance that the two flow connecting pieces 50, 52 are positioned in this axial end area 44, i.e., in an axial area in which the waste gas flow connecting piece 30 is also located, the outer housing part 14 can be provided, together with the pump housing 58, the two flow connecting pieces 50, 52 and also the line connecting branches 66, 68, as a single component, in which the aforementioned assembly units are connected integrally with one another. This avoids additional mounting operations and connection areas, which may lead to the development of leaks. In connection with the circumstance that the pump housing 58 or the two flow connecting pieces 50, 52 are located in the same axial area as the waste gas flow connecting piece 30, and consequently overlap with this axially at least in some areas, a compact design is obtained, which also makes accommodation possible in a crowded space in a vehicle.

Figure 5:
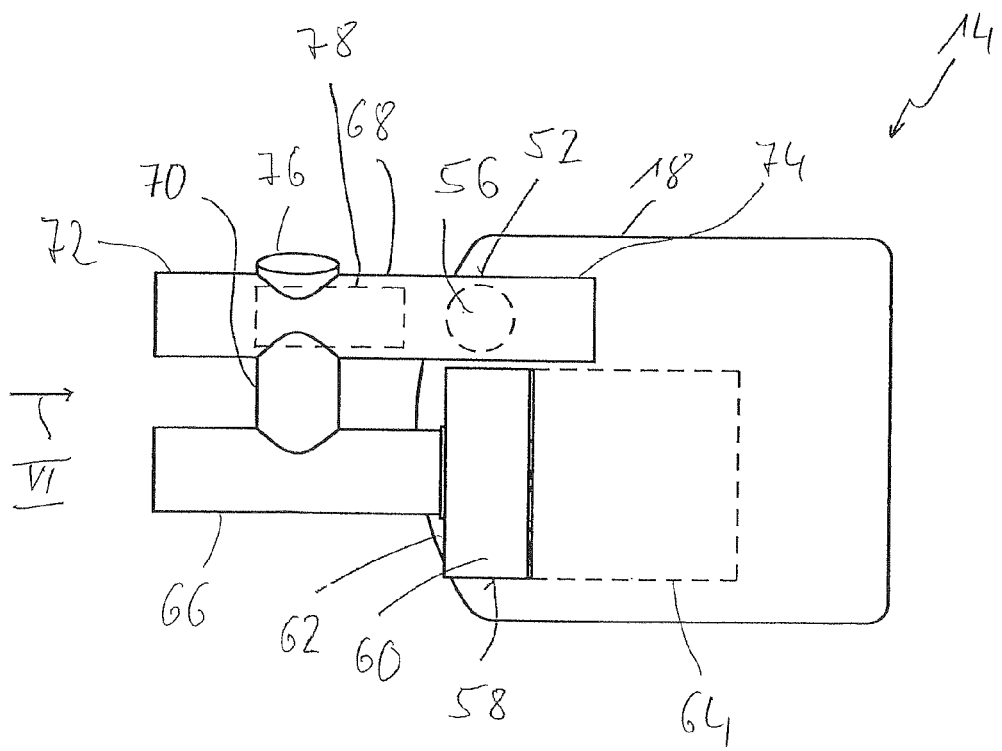
FIG. 5 is a side view of an outer housing part corresponding to FIG. 2 with an alternative design.
Figure 6:
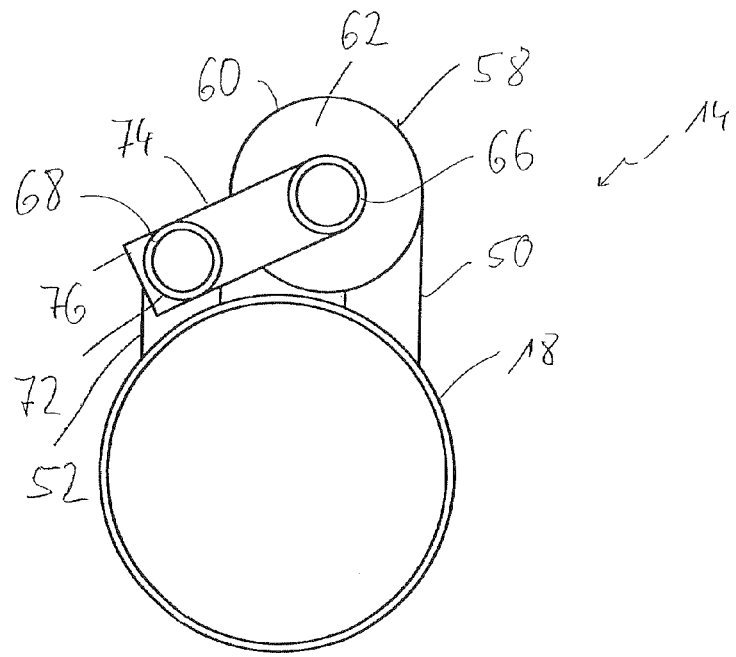
FIG. 6 is an end view of the outer housing part according to FIG. 5, as viewed in direction VI in FIG. 5.

A modified type of embodiment of the outer housing part 14 is shown in FIGS. 5 and 6. The line connecting branch 66, which is provided at pump housing 58, and the line connecting branch 68, which is provided at the second flow connecting piece 52, are connected to one another in this type of embodiment by a bridging line 70. This means that the first flow opening 54 is or can be brought into connection with the second flow opening 56 of the second flow connecting piece 52 via the line connecting branch 66 and via this bridging line 70. The line connecting branch 70 is designed, furthermore, such that it has two connection areas 72, 74.

For example, a line leading away from a water jacket of an internal combustion engine may be connected in the connection area 72, while a line leading to a vehicle heat exchanger may be connected in the connection area 74. The bridging line 70 may be made integrally with both line connecting branches 66, 68 if a casting process is carried out. It may now be necessary to make an end area 76 of the bridging line 70, which said end area is located, for example, beyond the line connecting branch 68, into an open end area for removing a shaped part and to bring about a fluid-tight closure there later by inserting a closing element.

A valve arrangement, which is generally designated by 78 and operates in a pressure- and temperature-dependent manner and whose design may correspond to that of the valve arrangement known from DE 10 2006 012 212 A1, may be positioned in the line connecting branch 68. This means that this valve arrangement 78 is capable of preventing a flow connection of the connection area 72 with both the connection area 74 and the line connecting branch 66 depending on a pressure difference between the two connection areas 70, 72 and of abolishing this connection interruption in a temperature-dependent manner, so that the connection area 72 can be brought into flow connection with the connection area 74 and into an at least limited flow connection with the line connecting branch 66. Reference is herewith made for disclosing the mode of operation of such a valve arrangement to DE 10 2006 012 212 A1, whose content is herewith incorporated in the disclosure content of the present invention by reference.

Figure 7:
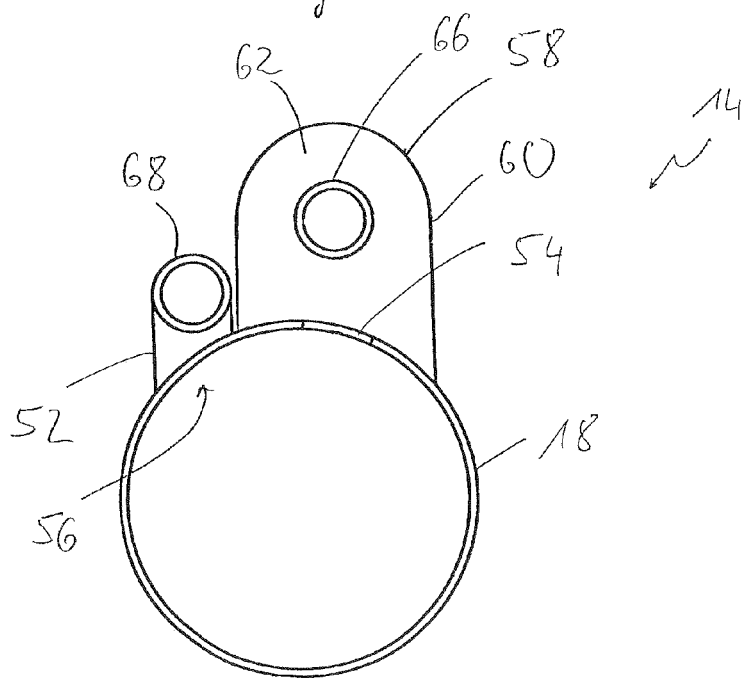
FIG. 7 is an end view of an alternative embodiment of the outer housing part corresponding to FIGS. 3 and 6.

Another modified type of embodiment of the outer housing part 14 is shown in FIG. 7. It is recognized here that the pump housing 58 is designed without the interposition of a flow connecting piece integral therewith as well as with the outer circumferential wall 18. In this type of embodiment, the pump housing 58 directly adjoins the first flow opening 54 designed as an opening in the outer circumferential wall 18 and is connected to or formed integrally in one piece with the outer circumferential wall 18, for example, with its circumferential wall 60 and its bottom wall 62. The generally pot-like structure of the pump housing 58 remains basically preserved here.

The above-mentioned explanations show that there is a great variability concerning the embodiment of the outer housing part 18, especially also concerning the connection of the pump housing 58 to the outer circumferential wall 18. It is possible in all these embodiments to manufacture the outer housing part 14 with the pump housing 58 and with one or both flow connecting pieces 52, 50 as an integral part, for example, according to a plastic injection molding method. It is possible in each of these differently shaped outer housing parts 14 to assemble this with the inner housing part 16 recognizable in FIG. 1 to obtain the heat exchanger housing 12.

While specific embodiments of the invention have been shown and described in detail to illustrate the application of the principles of the invention, it will be understood that the invention may be embodied otherwise without departing from such principles.

What is claimed is:

1. A heat exchanger arrangement for a vehicle heater, the arrangement comprising a pot-shaped heat exchanger housing extending in a direction of a longitudinal axis of the heat exchanger housing and comprising:
    an inner housing part with an inner wall provided as an inner circumferential wall extending along the longitudinal axis and surrounding the longitudinal axis and with an inner bottom wall integral with the inner circumferential wall at a first axial end thereof, the inner housing part with its inner circumferential wall surrounding a waste gas flow space;
    an outer housing part with an outer wall provided as an outer circumferential wall extending along the longitudinal axis and surrounding the longitudinal axis and with an outer bottom wall integral with the outer circumferential wall at a first axial end thereof;
    a heat carrier medium flow space formed between the inner circumferential wall and the outer circumferential wall, and between the inner bottom wall and the outer bottom wall;
    a flow opening and an additional flow opening open towards the heat carrier medium flow space and provided at the outer circumferential wall following each other in a circumferential direction and having the same axial distance to the outer bottom wall;
    a pump housing adjoining the flow opening, the pump housing being made integrally with the outer circumferential wall, the pump housing being provided for a heat carrier medium pump;
    a waste gas flow connecting piece provided at the inner circumferential wall, the waste gas flow connection piece having a discharge opening open towards the waste gas flow space, the waste gas flow connecting piece axially overlapping the flow opening and the additional flow opening at least partially;
    the inner circumferential wall of the inner housing part having a front surface defining the heat carrier medium flow space in an axial direction, the front surface being arranged obliquely in relation to the longitudinal axis of the housing;
    the outer circumferential wall of the outer housing ending obliquely at a second axial end thereof located at a distance from the first axial end thereof and being connected to the inner housing part at the front surface such that the heat carrier medium flow space is defined on the outside in a radial direction only by the outer circumferential wall of the outer housing part and that the flow opening and the additional flow opening are arranged on a first axial side with respect to the front surface and the waste gas flow connecting piece is arranged on a second axial side with respect to the front surface.

2. A heat exchanger arrangement in accordance with claim 1, wherein the flow opening is provided by a flow connecting piece.

3. A heat exchanger arrangement in accordance with claim 2, wherein the flow connecting piece is made integrally with the outer wall and the pump housing is made integrally with the flow connecting piece.

4. A heat exchanger arrangement in accordance with claim 1, wherein the pump housing has a pot-shape with a bottom wall and with a circumferential wall.

5. A heat exchanger arrangement in accordance with claim 4, wherein the pump housing is connected to the flow opening through the circumferential wall of the pump housing.

6. A heat exchanger arrangement in accordance with claim 1, further comprising a line connecting branch connected to the pump housing.

7. A heat exchanger arrangement in accordance with claim 6, wherein:
    the pump housing has a pot-shape with a bottom wall and with a circumferential wall; and
    the line connecting branch is connected to the pump housing at the bottom wall of the pump housing.

8. A heat exchanger arrangement in accordance with claim 6, wherein the line connecting branch is made integrally with the pump housing.

9. A heat exchanger arrangement in accordance with claim 1, further comprising an additional flow connecting piece forming the additional flow opening on the outer circumferential wall of the outer housing part.

10. A heat exchanger arrangement in accordance with claim 9, further comprising a bridging line connecting the flow opening to the additional flow opening.

11. A heat exchanger arrangement in accordance with claim 1, wherein:
    the pump housing together with the outer housing part is an injection-molded plastic part.

* * * * *